United States Patent
Bailly et al.

(10) Patent No.: US 6,333,394 B1
(45) Date of Patent: *Dec. 25, 2001

(54) COPOLYCARBONATE PREPARATION BY SOLID STATE POLYMERIZATION

(75) Inventors: Christian Maria Emile Bailly, Antwerpen (BE); Bhaskar Bhairavnath Idage, Pune (IN); Swaminathan Sivaram, Pune (IN); Nayaku Nivarati Chavan, Pune (IN); Rein Mollerus Faber, Bergen op Zoom (NL); Shamal Karunakaran Menon, Pune; Gautam Chatterjee, New Delhi, both of (IN); Godavarthi Satyana Varadarajan, Dallas, TX (US); James Day, Scotia; Patrick Joseph McCloskey, Watervliet, both of NY (US); Joseph Anthony King, Jr., Midlothian, VA (US); Arun Savalaram Jadhav, Pune (IN)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/379,234

(22) Filed: Aug. 23, 1999

Related U.S. Application Data

(63) Continuation-in-part of application No. 09/370,433, filed on Aug. 9, 1999, now Pat. No. 6,143,859.

(51) Int. Cl.⁷ .................................................. C08G 64/00
(52) U.S. Cl. ............................................. 528/196; 528/198
(58) Field of Search ................................. 528/196, 198

(56) References Cited

U.S. PATENT DOCUMENTS

| | | | |
|---|---|---|---|
| 4,075,108 | 2/1978 | Higley et al. | 210/500 |
| 4,217,437 | 8/1980 | Schreckenberg et al. | 528/171 |
| 4,217,438 | 8/1980 | Brunelle et al. | 528/202 |
| 4,238,596 | 12/1980 | Quinn | 528/179 |
| 4,238,597 | 12/1980 | Markezich et al. | 528/179 |
| 4,393,190 | 7/1983 | Tyrell et al. | 528/170 |
| 4,506,065 | 3/1985 | Miller et al. | 528/194 |
| 4,657,977 | 4/1987 | Peters | 525/92 |
| 4,713,439 | 12/1987 | St. Clair et al. | 528/353 |
| 4,757,150 | 7/1988 | Guggenheim et al. | 528/461 |
| 4,948,871 | 8/1990 | Fukuoka et al. | 528/481 |
| 5,204,377 | 4/1993 | Fukawa et al. | 521/60 |
| 5,414,057 | 5/1995 | Campbell et al. | 525/462 |
| 5,710,238 | 1/1998 | Sivaram et al. | 528/196 |
| 5,717,056 | 2/1998 | Varadarajan et al. | 528/196 |
| 6,031,062 | 2/2000 | Day et al. | 528/196 |
| 6,060,576 | 5/2000 | Wisnudel et al. | 528/196 |

FOREIGN PATENT DOCUMENTS

| | | |
|---|---|---|
| 0 254 994 | 2/1988 | (EP) . |
| 0 375 935 | 7/1990 | (EP) . |
| 0 486 038 | 5/1992 | (EP) . |
| 0 621 297 | 10/1994 | (EP) . |
| 61 148401 | 7/1986 | (JP) . |
| 62 015322 | 1/1987 | (JP) . |
| 04 309525 | 11/1992 | (JP) . |
| 04 309527 | 11/1992 | (JP) . |
| 302832 | 12/1993 | (JP) . |
| 189421 | 8/1994 | (JP) . |
| WO 00 23498 | 4/2000 | (WO) . |
| WO 00 37442 | 6/2000 | (WO) . |

OTHER PUBLICATIONS

Copending U.S. patent application Ser. No. 09/370,433, filed Aug. 9, 1999, by Gautam Chatterjee et al., entitled ""Copolycarbonate Preparation by Solid State Polymerization.

*Primary Examiner*—Terressa M. Boykin
(74) *Attorney, Agent, or Firm*—Noreen C. Johnson; Douglas E. Stoner

(57) ABSTRACT

Copolycarbonates containing such structural units as birefringence-reducing or "soft block" units are prepared by conducting a reaction, such as melt polymerization or equilibration, between a precursor polycarbonate and a monomer, polycarbonate oligomer or high molecular weight polycarbonate which is a source of other structural units. The crystallinity of the resulting precursor copolycarbonate or one of the reagents employed in its preparation is enhanced and the precursor copolycarbonate is subjected to solid state polymerization.

29 Claims, No Drawings

COPOLYCARBONATE PREPARATION BY SOLID STATE POLYMERIZATION

CROSS-REFERENCE TO RELATED APPLICATION

This application is a continuation-in-part of application Ser. No. 09/370,433 filed on Aug. 9, 1999 now U.S. Pat. No. 6,143,859.

BACKGROUND OF THE INVENTION

This invention relates to the preparation of copolycarbonates, and more particularly to a method for their preparation which includes solid state polymerization.

Solid state polymerization is disclosed, for example, in U.S. Pat. Nos. 4,948,871, 5,204,377 and 5,717,056, the disclosures of which are incorporated herein. It typically involves a first step of forming a prepolymer, typically by melt polymerization (i.e., transesterification) of a dihydroxyaromatic compound such as 2,2-bis(4-hydroxyphenyl) propane (bisphenol A) with a diaryl carbonate such as diphenyl carbonate; a second step of crystallizing the prepolymer; and a third step of building the molecular weight of the crystallized prepolymer by heating to a temperature between its glass transition temperature and its melting temperature. Use of this method is of increasing interest by reason of its effectiveness and environmental benefits.

The end uses for which the overall properties of polycarbonates make them particularly suitable potentially include many which require specific properties not possessed by aromatic polycarbonates as a genus, and in particular not possessed by bisphenol A polycarbonates. For example, polycarbonates are widely used for the fabrication of optical data-recording media, including optical disks as exemplified by compact audio disks and CD-ROM disks used in computers. By reason of the optical requirements of such disks, particularly those having read-write capability, it is essential or at least strongly preferred that they have low birefringence. Birefringence is the difference between indices of refraction for light polarized in perpendicular directions. Birefringence leads to phase retardation between different polarization components of the laser beam which reads the optical disk, thereby reducing readability. Polycarbonates prepared from bisphenol A have relatively high birefringence, which is typically lowered for optical purposes by incorporation of such monomers as 6,6'-dihdyroxy-3,3,3',3'-tetramethyl-1,1'-spiro(bis)indane, hereinafter designated "SBI", or 1,1,3-trimethyl-3-(4-hydroxyphenyl)-5-hydroxyindane ("CD-1").

It is also frequently desirable to improve the processability of polycarbonates by the incorporation, for example, of "soft blocks" derived from aliphatic compounds such as alkanedioic acids or polyoxyalkylene glycols. This is particularly important in optical disk fabrication, since processability is generally degraded by the presence of such monomers as SBI and CD-1 as a result of such factors as increase in glass transition temperature.

Typical interfacial methods of polycarbonate preparation, by the reaction of one or more dihydroxyaromatic compounds under alkaline conditions with phosgene in a mixed aqueous-organic system, are frequently not adaptable to preparation of "soft block" polycarbonates since the alkaline environment can degrade the soft block monomer. Melt (transesterification) methods, by the reaction of the dihydroxyaromatic compounds with diaryl carbonate, are likewise of limited use because the high temperatures (on the order of 300° C.) required for building a high molecular weight polymer can cause thermal decomposition of the soft blocks.

The use of solid state polymerization (hereinafter sometimes "SSP") conditions, which are usually milder and require lower polymerization temperatures than melt polymerization, could be of use for the preparation of copolycarbonates containing soft blocks and/or birefringence-decreasing units. However, many monomers, especially the soft block ones, may undergo degradation even under SSP conditions even though the structural units derived therefrom may be stable under the same conditions. An alternative method of incorporating the copolymeric units in a polymer ultimately produced by SSP is therefore necessary.

SUMMARY OF THE INVENTION

The present invention is based on the discovery that copolymeric units may be incorporated in a precursor copolycarbonate by various procedures, and said precursor copolycarbonate subsequently exposed to SSP conditions. The product is a high molecular weight copolycarbonate having the desired properties, which may include high processability and low birefringence.

The invention is a method for preparing a copolycarbonate which comprises:

(I) contacting (A) a precursor polycarbonate with (B) a monomeric or polymeric source of other structural units than those present in component A, which are to be incorporated in the copolycarbonate, said contact being under conditions promoting reaction of components A and B with incorporation of said structural units to form a precursor copolycarbonate;

(II) converting component A, component B or said precursor copolycarbonate to a polycarbonate of enhanced crystallinity, either prior to or following step I; and (III) subjecting said copolycarbonate of enhanced crystallinity to solid state polymerization, following step II and either concurrently with or following step I.

DETAILED DESCRIPTION; PREFERRED EMBODIMENTS

The essential constituents employed in the method of this invention are sometimes designated "components" irrespective of whether they are or are not believed to undergo reaction during the practice of said method.

Component A, then, is a precursor polycarbonate. As used herein, "polycarbonate" includes copolycarbonates and polyestercarbonates. Suitable precursor polycarbonates may be prepared by the first step of a melt polycarbonate process or by bischloroformate oligomer preparation followed by hydrolysis and/or endcapping and isolation. Such oligomers most often have an intrinsic viscosity in the range of 0.06–0.30 dl/g, all intrinsic viscosity values herein being as determined in chloroform at 30° C.

The precursor polycarbonate may also be a high molecular weight homo- or copolycarbonate; i.e., one having an intrinsic viscosity above 0.30 dl/g. Numerous kinds of suitable high molecular weight homo- and copolycarbonates are suitable, including conventional linear polycarbonates in virgin form. They may be prepared from any of the known dihydroxy compounds useful as monomers, including dihydroxyaromatic compounds such as bisphenol A, SBI and others designated by name or structural formula (generic or specific) in U.S. Pat. No. 4,217,438, the disclosure of which is incorporated by reference herein.

Also included are branched polycarbonates, formed by the reaction of a linear polycarbonate or its precursor(s) with a branching agent such as 1,1,1-tris(4-hydroxyphenyl) ethane. It may also be a copolycarbonate, particularly a copolycarbonate oligomer or high molecular weight copolycarbonate containing units adapted to maximize solvent resistance. Such units will typically comprise about 25–50% of total carbonate units in the polymer.

Recycled polycarbonates, for example from compact disks, may also be employed. Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or by other art-recognized procedures for separation of non-polycarbonate constituents. Other types of polycarbonate, such as interfacially prepared polycarbonate and polycarbonate extruder wastes, may also be employed as precursors.

Component B is a source of other structural units than those present in component A, said other structural units intended to be incorporated in the product. The other units may be present in combination with units which are present in component A.

Thus, component B may be a monomeric compound. Suitable monomeric compounds include dihydroxy, preferably dihydroxyaromatic, compounds as illustrated by the dihydroxy compounds disclosed by name or formula (generic or specific) in U.S. Pat. No. 4,217,438, the disclosure of which is incorporated by reference herein. They also include soft block monomer sources such as polyoxyalkylene glycols, which for the purpose of this invention are considered to be monomers even though they are polymeric in structure; e.g., polyethylene glycol or polypropylene glycol, typically having a number average molecular weight, Mn, in the range of about 150–50,000, or alkanedioic acids, the latter generally employed in the form of a diaryl ester for ease of incorporation by the methods hereinafter discussed.

Finally, they include oligomeric phenolic precursors such as the oligoimides disclosed in copending, commonly owned application Ser. No. 09/217,026. These are illustrated by polycarbonates derived from the bisimide diol of the formula

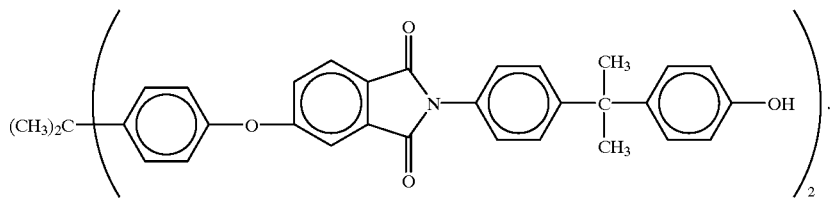

Oligomeric or high molecular weight homo- and copolycarbonates, similar to those used as component A, may also be employed, with the proviso that they contain units not present in component A. Thus, for example, if component A is a bisphenol A homopolycarbonate, component B may be SBI, 4,4'-dihydroxybiphenyl, 1,1,3-trimethyl-3-(4-hydroxyphenyl)-5-hydroxyindane (hereinafter sometimes "CD-1"), a polyoxyalkylene glycol or diphenyl dodecanedioate, or a polycarbonate or copolyestercarbonate of any molecular weight containing units derived from one of these. Copolycarbonates containing 4,4'-dihydroxybiphenyl units are of particular interest because of their increased rigidity of structure which is expected to enhance thermal stability and solvent resistance; SBI and CD-1 because of their improved optical properties which provide improved performance in data recording media such as optical disks; and the aforementioned oligoimides because of their potential for producing polycarbonates with improved thermal stability.

In step I of the method of this invention, components A and B are brought into contact under conditions promoting reaction between them. Such conditions generally involve temperatures in the range of about 170–250° C., frequently including staged heating at progressively increasing temperatures. The conditions may be those known in the art to be applicable to melt polymerization to form oligomers, or to reactive extrusion or redistribution. They may include progressively decreased pressures, starting at atmospheric and terminating at about 100 torr or even lower, although decreasing pressure is not always necessary or even preferred.

Since the reaction which occurs in step I is in essence an equilibration, the use of a dihydroxy compound alone as component B may result in an undesirable decrease in molecular weight. This may be an initial decrease followed by an increase or, on occasion, a permanent decrease. It is particularly noticeable if component B is a monomeric bisphenol such as SBI and the entire portion of both components is introduced initially, It may even be observed that the initial decrease is so great that an undesirable amount of time is needed to compensate for it.

Two process variants may be employed, individually or in combination, to avoid such a decrease. An initial decrease may be avoided by introducing component B, especially when it is a monomeric bisphenol, incrementally during the reaction, with staged heating after each increment is added. A longer term decrease may be compensated for by the addition of diaryl carbonate, such as diphenyl carbonate, concurrently with the monomeric bisphenol, whereupon the two react to form additional carbonate structural units. Molar ratios of diaryl carbonate to monomeric bisphenol added at this stage are usually in the range of about 0.5–1.2:1, preferably 1:1.

It is usually preferred, sometimes even necessary, to employ a catalyst during step I. Suitable catalysts include those effective in such polycarbonate reactions as melt polymerization, redistribution, equilibration and solid state polymerization.

A wide variety of bases and Lewis acids are useful for this purpose. They include the catalysts disclosed in U.S. Pat. No. 5,414,057 and in the aforementioned U.S. Pat. No. 5,717,056, examples of which are alkali metal hydroxides and alkoxides; metal, especially alkali metal, hydrides and borohydrides; organotin and organotitanium compounds; aliphatic and heterocyclic amines; phosphines; and tetraalkylammonium and tetraalkylphosphonium hydroxides, alkoxides, carboxylates and tetraphenylborates. Also included are quaternary bisphenolates such as those disclosed in copending, commonly owned application Ser. No. 08/768,871, all of said patents and application being incorporated by reference herein. The quaternary bisphenolates may be represented by the formula

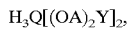

wherein A is unsubstituted p-phenylene, Q is a monocationic carbon-and nitrogen-containing moiety containing 9–34 atoms and Y is a bridging radical in which one or two carbon atoms separate the A values. Particularly suitable quaternary bisphenolates are those in which Y is isopropylidene and Q is a hexaalkylguanidinium cation, especially hexaethylguanidinium.

The preparation of quaternary bisphenolates is illustrated by the following example. "Catalyst solution" in this example is an aqueous solution of 28.54% (by weight) hexaethylguanidinium chloride and 10.09% sodium chloride.

EXAMPLE 1

A 5-I round-bottomed flask was purged with nitrogen and charged with 228.29 g (1 mole) of bisphenol A, 20.29 g (0.5 mole) of sodium hydroxide and 300 ml of methanol. The resulting solution was magnetically stirred under nitrogen. A blend of 462.26 g of catalyst solution (0.5 mole of hexaethylguanidinium chloride) and about 175 ml of methanol was added rapidly, whereupon a solid immediately precipitated. Methanol, 900 ml, was added with stirring to redissolve all of the solids.

Stirring was continued for 15 minutes, after which 1100 ml of water was added to reprecipitate the solids. The flask was cooled to 20° C. in ice and vacuum filtered. The filter cake was washed with 1200 ml of water and dried in a vacuum oven at 75° C., yielding 335.44 (98.1% crude yield) of a white solid. Recrystallization from methanol followed by vacuum drying yielded 244.14 g (71.4% of theoretical) of purified product in the form of colorless crystals with a melting point of 208–210° C. The purified product was shown by elemental analysis, atomic adsorption analysis and proton nuclear magnetic resonance spectroscopy to be the desired hexaethylguanidinium bisphenolate, having the stoichiometric proportions of three hydrogen atoms, one hexaethylguanidinium cation moiety and two bisphenol A dianion moieties.

Compounds useful as catalysts may be used singly or in combination. Typical combinations include an inorganic constituent such as an alkali metal hydroxide and an organic constituent such as a tetraalkylammonium hydroxide. Total catalyst concentration is most often about 1–1,000 ppm (by weight) based on component A.

The product of step I is a precursor copolycarbonate comprising the structural units present in components A and B, formed by equilibration or the equivalent thereof. The proportion of structural units therein will, for the most part, be the same as the proportion in the combination of components A and B. Thus, the proportions of said components in the equilibration reaction mixture should correspond to the desired proportion of respective structural units in the product. This proportion is subject to wide variation, depending on the intended use of the product copolycarbonate, and is in no way critical for the purposes of the invention. For the most part, however, the proportion of other structural units will be in the range of about 1–50 mole percent based on total units in the product.

Step II is a step of enhancement of crystallinity. It may be and most often is performed on the precursor copolycarbonate produced in step I. However, it is also within the scope of the invention to enhance the crystallinity of either component A or component B, prior to performing step I. For example if component A is an SBI polycarbonate oligomer and component B is a bisphenol A polycarbonate oligomer, crystallinity enhancement may be performed on one of them after which they may undergo reaction to form a precursor copolycarbonate which itself inherently has enhanced crystallinity.

Crystallinity enhancement may be achieved by known methods such as solvent treatment or heat treatment as disclosed in the aforementioned U.S. Pat. No. 4,948,871 and/or contact, typically at a temperature above about 110° C., with one or more catalysts as disclosed in the aforementioned U.S. Pat. No. 5,717,056. The catalysts used may include certain of those employed in step I, especially alkali metal hydroxides and alkoxides; quaternary bisphenolates; tetraalkyl-ammonium hydroxides, alkoxides and carboxylates; and tetraalkyl-phosphonium hydroxides, alkoxides and carboxylates.

It is sometimes found that the precursor copolycarbonate prepared in step I inherently has the necessary enhanced crystallinity. Thus, the invention embraces situations in which enhancement of crystallinity is inherent in and simultaneous with step I.

Step III is the solid state polymerization step. It is effected at a temperature between the glass transition temperature and the melting temperature of the enhanced crystallinity polycarbonate precursor, most often about 10–50° C. below its melting temperature. In general, temperatures in the range of about 150–270° and especially about 180–250° C. are suitable.

As disclosed in the aforementioned U.S. Pat. Nos. 4.948, 871, 5,204,377 and 5,717,056, the solid state polymerization step may be achieved in the absence or presence of catalysts. When present, catalysts may often be the same as those employed in step I and may function in both steps without further catalyst addition.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing by-products, including water, hydroxyaromatic compound (such as phenol) corresponding to the carbonate employed to produce the precursor copolycarbonate, and any volatile carbonate formed as a by-product. Programmed heating may be advantageously employed. As an alternative to conditions of intimate gas-solid contact, the polymerization may be conducted at reduced pressure, typically less than about 100 torr, preferably with efficient mixing.

Step III may be performed either concurrently with or following step I, provided it follows step II. Thus, in certain instances step II may be employed on either component A or B to enhance its crystallinity, after which the SSP step may be conducted without a separate intervening step of oligomer formation. This is true, for example, when component B is a soft block monomer such as polyethylene glycol, which may be incorporated in the polymer during the SSP step.

The method of the invention is illustrated by the following examples. Percentages and proportions are by weight unless otherwise indicated. Intrinsic viscosities were determined in Molecular weights were determined by gel permeation chromatography relative to polystyrene.

EXAMPLE 2

A 1-I glass melt polymerization reactor was passivated by acid washing, rinsing with deionized water and overnight drying at 70° C. It was charged with 130.4 g (608.6 mmol) of diphenyl carbonate and 120 g (525.6 mmol) of bisphenol A. A solid nickel stirrer was suspended in the mixture and the reactor was purged with nitrogen and heated to 180° C., whereupon the reaction mixture melted. Upon complete melting, it was allowed to equilibrate for 5–10 minutes, with stirring. There were then added, with stirring, 600 μl of a 0.221 M aqueous tetramethylammonium maleate solution and 500 μl of a 0.01 M aqueous sodium hydroxide solution. Heating at 180° C. and stirring were continued for 5 minutes, after which the temperature was raised to 210° C. and the pressure decreased to 180 torr, whereupon phenol began to distill. After 10 minutes, a bisphenol A polycarbonate oligomer had been produced.

The oligomer was returned to atmospheric pressure and 11 g (27.6 mmol) of a polyethylene glycol having a Mn of 400 was added through a syringe. The temperature and pressure were brought to 210° C./100 torr for 60 minutes as phenol continued to distill. The temperature was then raised to 240° C. for about 15 minutes, after which about 80% of the theoretical amount of phenol had been removed and the product was poured into an aluminum tray. The resulting precursor copolycarbonate oligomer had a weight average molecular weight, Mw, of 2,180.

The precursor copolycarbonate was ground to a fine powder and suspended for 2 hours in a 70/30 (by volume) dimethyl carbonate-methanol mixture containing 100 ppm of tetramethyl-ammonium hydroxide. The suspension was filtered and the resulting copolycarbonate of enhanced crystallinity was dried for 12 hours in a vacuum oven at 110° C.

SSP of the copolycarbonate of enhanced crystallinity was conducted in a fluidized bed under a nitrogen flow of 8 I/min at 150° C. for 1 hour, 190° C. for 1 hour, 210° C. for 1.5 hours and 230° C. for 1.5 hours, with analysis of the product copolycarbonate after each temperature increment. The results are given in Table I.

TABLE I

| Time, min | Temperature, ° C. | Mw | Tg, ° C. | Tm onset, ° C. |
| --- | --- | --- | --- | --- |
| 0 | — | 2,180 | 64 | 152 |
| 60 | 150 | 10,680 | 90 | 195 |
| 120 | 190 | 25,580 | 106 | 214 |
| 210 | 210 | 44,880 | 112 | 232 |
| 300 | 230 | 106,870 | 117 | 248 |

EXAMPLE 3

A 9-g sample of a melt prepared bisphenol A polycarbonate having a Mw of about 32,000 was dissolved in 30 ml of methylene chloride and precipitated by addition of 50 ml of ethyl acetate, after which analysis showed the presence of sufficient crystallinity to undergo efficient SSP. There were added 1 g (3.16 mmol) of SBI and 750 mg (3.50 mmol) of diphenyl carbonate; the mixture was suspended in 100 ml of methanol containing 100 ppm tetramethylammonium maleate after which the methanol was stripped and the solid copolycarbonate of enhanced crystallinity was dried in a vacuum oven for 12 hours at 110° C.

SSP was conducted on a 5-g sample of the copolycarbonate in a manner similar to that employed in Example 2. The results are given in Table II.

TABLE II

| Time, min | Temperature, ° C. | Mw | Tg, ° C. | Tm onset, ° C. |
| --- | --- | --- | --- | --- |
| 0 | — | 35,200 | 148 | 224 |
| 60 | 180 | 12,000 | 145 | 216 |
| 150 | 205 | 26,900 | 152 | 235 |
| 210 | 220 | 48,500 | 155 | 251 |
| 270 | 240 | 59,500 | 159 | 270 |

EXAMPLE 4

A 9-g sample of the polycarbonate employed in Example 3 was treated in the same manner to enhance crystallinity. SSP was conducted as in Example 3, except that three 1-g portions of SBI and three 2.16-mmol portions of diphenyl carbonate were introduced during the polymerization. The results are given in Table III.

TABLE III

| Time, min | Temperature, ° C. | Mw | Tg, ° C. | Tm onset, ° C. |
| --- | --- | --- | --- | --- |
| 0* | — | 31,600 | 148 | 183 |
| 60 | 160 | 21,900 | 145 | 203 |
| 120 | 180 | 36,600 | 153 | 218 |
| 180* | 200 | 46,500 | 156 | 230 |
| 240 | 160 | 21,200 | 134 | 197 |
| 300 | 180 | 33,300 | 153 | 222 |
| 360* | 200 | 69,600 | 162 | 245 |
| 420 | 160 | 26,800 | 128 | 207 |
| 480 | 180 | 29,800 | 150 | 228 |
| 540 | 200 | 41,800 | 158 | 237 |
| 600 | 210 | 38,400 | 162 | 241 |
| 660 | 215 | 48,100 | 165 | 243 |

SBI portion added

It is apparent that relatively large proportions of SBI can be introduced in stages, with reasonably good control of the molecular weight drops resulting from each addition.

EXAMPLE 5

A 100-ml 3-necked flask was charged with 15.4 g (50 mmol) of SBI, 11.23 g (52.5 mmol) of diphenyl carbonate and 0.2268 mg (0.0012 mmol) of tetramethylammonium maleate. The mixture was heated under nitrogen for 60 minutes at 180° C., after which the pressure was reduced to 100 torr and then stepwise to 1 torr over 140 minutes. The temperature was increased to 200° C. for 20 minutes, whereupon phenol began to distill. The temperature was further increased to 230° C. (20 minutes), 250° C. (20 minutes) and 270° C. (30 minutes). The reaction was stopped when about 80% of theoretical phenol had been removed, whereupon an SBI polycarbonate oligomer having a Mw of 1,150 was isolated.

The crystallinity of a 9-g portion of a bisphenol A polycarbonate oligomer prepared by melt polymerization and having a Mw of about 8,000 was enhanced by dissolving in dimethyl carbonate containing 100 ppm of tetramethylammonium maleate, stirring for 5 minutes, vacuum stripping and drying in a vacuum oven. A mixture of 9 parts of the enhanced crystallinity bisphenol A polycarbonate oligomer and 1 part of the SBI polycarbonate oligomer was subjected to SSP in a fluidized bed reactor under a nitrogen flow of 3 l/min, at 180° C. for 1 hour, 210° C. for 1 hour, 220° C. for 2 hours and 230° C. for 2 hours. The product copolycarbonate had a Mw of 39,600 and a Tg of 142° C.

EXAMPLE 6

A mixture of 97.5 mmol of a bisphenol A polycarbonate having a Mw of 57,800 and 2.5 mmol of a polyethylene glycol having a Mn of 200 was extruded at 15.4–33.0 kg/hr and a screw speed of 250–300 rpm, with the barrel set temperature at 240° C. The crystallinity of the resulting precursor copolycarbonate, formed by equilibration, was enhanced by dissolution in the dimethyl carbonate-methanol mixture of Example 2 with 100 ppm of the quaternary bisphenolate of Example 1, followed by drying.

The enhanced crystallinity precursor polycarbonate was subjected to SSP in a fluidized bed reactor under a nitrogen flow of 8 l/min, at temperatures of 180° C. for 2 hours, 190° C. for 1 hour, 200° C. for 1 hour, 210° C. for 1 hour, 220° C. for 2 hours and 230° C. for 1 hour. The product copolycarbonate had a Mw of 43,700 and a Tg of 139° C.

EXAMPLE 7

The procedure of Example 6 was repeated, using a polyethylene glycol having a Mn of 400. The product copolycarbonate had a Mw of 47,100 and a Tg of 139° C.

EXAMPLE 8

A 500-ml round-bottomed flask equipped with a mechanical stirrer, addition funnel and reflux condenser was charged with 9 g of an optical quality bisphenol A polycarbonate oligomer having an intrinsic viscosity of 0.34 dl/g, which had been precrystallized by dissolution in chloroform and reprecipitation with acetone, 1 g of 4,4'-dihydroxybiphenyl polycarbonate oligomer prepared by melt polymerization of 4,4'-dihydroxybiphenyl, 50 ppm (based on total polycarbonates) of the quaternary bisphenolate of Example 1 and 100 ml of methanol. The mixture was stirred at room temperature for 30 minutes, after which the methanol was removed by vacuum stripping and the material was dried in vacuum. The resulting enhanced crystallinity precursor polycarbonate mixture had a Tm of 213° C.

The mixture was subjected to SSP in a glass reactor under a nitrogen flow of 1 l/min at 180° C. for 2 hours, 200° C. for 2 hours, 220° C. for 2 hours, 230° C. for 2 hours and 240° C. for 6 hours. The copolycarbonate product had an intrinsic viscosity of 0.70 dl/g, a Tg of 158° C. and a Tm of 285° C. Proton nuclear magnetic spectroscopy showed the presence of 9% 4,4'-dihydroxybiphenyl units.

A similar polycarbonate was obtained by an SSP process using a nitrogen flow of 3 l/min.

EXAMPLE 9

The flask of Example 8 was charged with a mixture of 18 parts of the precrystallized optical quality polycarbonate oligomer of Example 8, 2 g of 4,4'-dihydroxybiphenyl and 2.485 g of diphenyl carbonate, 50 ppm (based on total reagents) of the quaternary bisphenolate of Example 1 and 100 ml of methanol. The methanol was removed by vacuum stripping and the resulting enhanced crystallinity mixture was dried in vacuum. It was then subjected to SSP in a glass reactor under a nitrogen flow of 3 l/min at 180° C. for 2 hours, 200° C. for 6 hours, 220° C. for 4 hours and 240° C. for 8 hours. The copolycarbonate product had an intrinsic viscosity of 0.73 dl/g, a Tg of 161° C. and a Tm of 272° C. Proton nuclear magnetic spectroscopy showed the presence of 9% 4,4'-dihydroxybiphenyl units.

EXAMPLE 10

A mixture of 18 g of the precrystallized optical quality polycarbonate oligomer of Example 8 and 2 g of 4,4'-dihydroxybiphenyl was melt mixed in a molding machine, with stirring, for 5 minutes and extruded into pellets. The pellets were dissolved in 200 ml of chloroform and 50 ppm (based on total reagents) of the quaternary bisphenolate of Example 1 was added. The mixture was vacuum stripped and dried in vacuum to yield an enhanced crystallinity mixture which was subjected to SSP in a glass reactor under a nitrogen flow of 3 l/min at 175° C. for 2 hours, 200° C. for 4 hours, 220° C. for 4 hours and 240° C. for 4 hours. The resulting copolycarbonate had an intrinsic viscosity of 0.70 dl/g, a Tg of 157° C. and a Tm of 269° C. Proton nuclear magnetic spectroscopy showed the presence of 9% 4,4'-dihydroxybiphenyl units.

EXAMPLE 11

The procedure of Example 9 was repeated, substituting CD-1 for the 4,4'-dihydroxybiphenyl at a level of 1 g per 9 g of precrystallized optical quality polycarbonate. The SSP operation was conducted at 180° C. for 2 hours, 200° C. for 2 hours, 220° C. for 4 hours, 230° C. for 4 hours and 240° C. for 4 hours. The copolycarbonate product had an intrinsic viscosity of 0.73 dl/g, a Tg of 161° C. and a Tm of 285° C. Proton nuclear magnetic spectroscopy showed the presence of 9% CD-1 units.

EXAMPLE 12

A mixture of 18 g of the precrystallized optical quality polycarbonate oligomer of Example 8 and 2 g of CD-1 was melt mixed in a molding machine, with stirring, for 5 minutes and extruded into pellets. A 20-g sample of the pellets was charged to a 500-ml Parr reactor equipped with a heater, cooling apparatus, stirring apparatus and pressure gauge. The quaternary bisphenolate of Example 1 (50 ppm) and 20 ml of methanol were added and the mixture was heated to 105° C. at 2.4 atm for 0.5 hour. It was then cooled to room temperature and the methanol was removed by vacuum stripping, yielding an enhanced crystallinity mixture which was subjected to SSP in a glass reactor under a nitrogen flow of 3 l/min at 150° C. for 2 hours, 180° C. for 2 hours, 200° C. for 4 hours and 220° C. for 4 hours. The copolycarbonate product had an intrinsic viscosity of 0.30 dl/g, a Tg of 140° C. and a Tm of 228° C. Proton nuclear magnetic spectroscopy showed the presence of 9% CD-1 units.

EXAMPLE 13

Bisphenol A, 50 g (219 mmol) and aniline hydrochloride, 45.4 g (351 mmol) were combined in a 500-ml round-bottomed flask equipped with a nitrogen inlet, a condenser and a magnetic stirring bar. The contents in the flask were flushed with nitrogen at room temperature and the flask was heated up to 180° C. in an oil bath. Heating was continued for 30 minutes from the point at which all ingredients were molten (longer reaction time will give an increasing amount of the by-product diamino-BPA). The flask was taken out of the oil bath and 300 ml of water was added slowly to stop the reaction. The clear mixture was allowed to cool to 70° C. and the solution was neutralized to pH 7 by portionwise addition of 29.5 g (351 mmol) of sodium bicarbonate. The crude white product was filtered while hot and extracted with 200 ml of water at 80° C. The hot slurry was filtered and the wet cake was poured into 200 g of a 25/75% (by volume) isopropanol-methanol mixture. The slurry was stirred and allowed to cool to room temperature. After filtration and washing with 125 ml of the isopropanol-methanol mixture, the solid product was dried under vacuum at 80° C. The product (approximately 25 g, 50% of theoretical) was a white powder which was shown by high pressure liquid chromatographic analysis to contain 94% 2-(4-aminophenyl)-2-(4-hydroxyphenyl)propane, 4% bisphenol A and approximately 2% 2,2-bis(4-aminophenyl)propane, m.p. 197° C.

2,2-Bis[4-(3,4-dicarboxyphenoxy)phenyl]propane dianhydride, 30.1 g (58 mmol), 2-(4-aminophenyl)-2-(4-hydroxyphenyl)propane, 28.6 g (92% pure, 116 mmol) and o-xylene (235 g) were charged to a 500-ml two-necked round-bottomed flask equipped with a Dean-Stark trap, condenser, nitrogen inlet and magnetic stirring bar. The contents were flushed with nitrogen and the flask was immersed in an oil bath and heated to 170° C.

During heating, initially a sticky substance was formed (amic acid) which slowly dissolved again with liberation of water. The mixture was distilled for 3 hours, diluted with o-xylene to approximately 10% solids and allowed to cool to room temperature. The product bisimide crystallized from the solution, forming a thick mass. It was filtered off, washed with o-xylene, extracted with 300 g of methanol, filtered and extracted a second time with 600 g methanol. The product was dried at 80° C. under vacuum. It was determined by high pressure liquid chromatographic analysis to be the desired bisimide diol, 99% pure, in a yield of approximately 80%. Its melting point was 191° C.

Bisphenol A, 19.86 g (87.4 mmol), was mixed with the bisimide diol, 30 g (32 mmol), and diphenyl carbonate, 28 g (131 mmol) in a glass reactor which had been acid-washed, extensively rinsed with deionized water and deoxygenated by evacuation. Tetramethylammonium hydroxide, 110 µl of a 3 M aqueous solution, and sodium hydroxide, 50 µl of a 0.001 M aqueous solution, were injected into the powder in a nitrogen atmosphere. The reactor was deoxygenated again and heated to 220° C. over 40 minutes, with stirring, to produce a homogeneous melt. The pressure was reduced slowly over 20 minutes to about 190 torr, at which point the reactor was stopped again by pressurizing the reactor with nitrogen to atmospheric pressure. The product, which was the desired copolycarbonate oligomer, was removed from the reactor.

The flask of Example 8 was charged with 200 ml of ethylene dichloride, 45 g of an amorphous optical quality bisphenol A polycarbonate oligomer similar to that of Example 8, 5 g of the aforementioned copolycarbonate oligomer and 100 ppm (based on total oligomers) of tetramethylammonium maleate. The mixture was heated for 1 hour at 80° C., with vigorous stirring, cooled, vacuum stripped and dried under vacuum, yielding an oligomer mixture of enhanced crystallinity which was crushed to a particle size of 400–700 microns.

The enhanced crystallinity oligomer mixture was subjected to SSP was conducted at 190° C. for 1 hour, 220° C. for 2 hours, 230° C. for 4 hours and 240° C. for 4 hours. The copolycarbonate product had an intrinsic viscosity of 0.51 dl/g, a Tg of 153° C. and a Tm of 259° C. Proton nuclear magnetic spectroscopy showed the presence of 9% bisimide units.

EXAMPLE 14

The procedure of Example 13 was repeated with a mixture of 40 g of bisphenol A polycarbonate oligomer and 10 g of copolycarbonate oligomer. The product had an intrinsic viscosity of 0.52 dl/g, a Tg of 153° C. and a Tm of 256° C. Proton nuclear magnetic spectroscopy showed the presence of 18% bisimide units.

EXAMPLE 15

The procedure of Example 13 was repeated with a mixture of 38 g of bisphenol A polycarbonate oligomer and 2 g of copolycarbonate oligomer. The product had an intrinsic viscosity of 0.48 dl/g, a Tg of 149° C. and a Tm of 254° C.

What is claimed is:

1. A method for preparing a copolycarbonate which comprises:
   (I) contacting (A) a precursor polycarbonate with (B) a monomeric or polymeric source of structural units having structural features different from those present in component A, which are to be incorporated in the copolycarbonate, said contact being under conditions promoting reaction of components A and B with incorporation of the structural units in component B to form a precursor copolycarbonate;
   (II) converting component A, component B or said precursor copolycarbonate to a polycarbonate of enhanced crystallinity, either prior to or following step I; and
   (III) subjecting said copolycarbonate of enhanced crystallinity to solid state polymerization, following step II and either concurrently with or following step I.

2. A method according to claim 1 wherein component B is a monomeric source.

3. A method according to claim 2 wherein component B is a dihydroxyaromatic compound.

4. A method according to claim 3 wherein component B is 6,6'-dihdyroxy-3,3,3',3'-tetramethyl-1,1'-spiro(bis)indane.

5. A method according to claim 3 wherein component B is 4,4'-dihydroxybiphenyl.

6. A method according to claim 3 wherein component B is 1,1,3-trimethyl-3-(4-hydroxyphenyl)-5-hydroxyindane.

7. A method according to claim 3 wherein component B is a bisimide diol of the formula

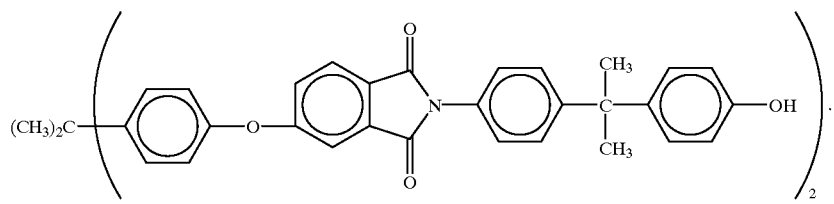

8. A method according to claim 2 wherein component B is a polyoxyalkylene glycol.

9. A method according to claim 8 wherein component B is a polyethylene glycol having a number average molecular weight in the range of about 150–50,000.

10. A method according to claim 1 wherein component B is an oligomeric homo- or copolycarbonate having an intrinsic viscosity in the range of about 0.06–0.30 dl/g as determined in chloroform at 25° C.

11. A method according to claim 1 wherein component B is an oligomeric polycarbonate derived from a bisimide diol of the formula

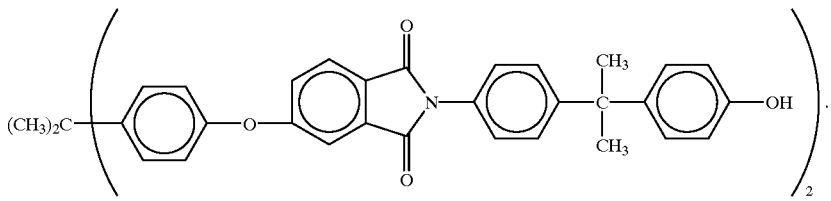

12. A method according to claim 1 wherein component B is a high molecular weight homo- or copolycarbonate.

13. A method according to claim 1 wherein component A is an oligomeric polycarbonate having an intrinsic viscosity in the range of about 0.06–0.30 dl/g as determined in chloroform at 25° C., said oligomeric polycarbonate comprising structural units derived from at least one of dihydroxyaromatic compounds and polyoxyalkylene glycols.

14. A method according to claim 13 wherein component A is a bisphenol A polycarbonate.

15. A method according to claim 1 wherein component A is a high molecular weight homo- or copolycarbonate comprising structural units derived from at least one of dihydroxyaromatic compounds and polyoxyalkylene glycols.

16. A method according to claim 15 wherein component A is a bisphenol A polycarbonate.

17. A method according to claim 1 wherein the conditions of step I include temperatures in the range of about 170–250° C.

18. A method according to claim 17 wherein a catalyst is employed in step I.

19. A method according to claim 18 wherein the catalyst is a base or a Lewis acid.

20. A method according to claim 17 wherein the conditions of step I are melt polymerization conditions.

21. A method according to claim 17 wherein the conditions of step I are equilibration conditions.

22. A method according to claim 17 wherein component B is introduced incrementally during step I.

23. A method according to claim 17 wherein a diaryl carbonate is introduced concurrently with component B.

24. A method according to claim 17 wherein component A or B is converted in step II to said polycarbonate of enhanced crystallinity and step II precedes step I.

25. A method according to claim 17 wherein said precursor copolycarbonate is converted in step II to said polycarbonate of enhanced crystallinity and step II follows step I.

26. A method according to claim 17 wherein step II is simultaneous with step I.

27. A method according to claim 17 wherein step III follows step I.

28. A method according to claim 17 wherein a catalyst is employed in step III.

29. A method according to claim 28 wherein the catalyst in step III is the same catalyst employed in step I.

* * * * *